United States Patent [19]

Hsu

[11] Patent Number: 5,792,486
[45] Date of Patent: Aug. 11, 1998

[54] RETAINER FOR THE DIE PIN IN AN ACCUMULATOR HEAD

[75] Inventor: John S. Hsu, Cincinnati, Ohio

[73] Assignee: Cincinnati Milacron Inc., Cincinnati, Ohio

[21] Appl. No.: 832,513

[22] Filed: Apr. 3, 1997

[51] Int. Cl.[6] .................................. B29C 47/22; B29C 49/04
[52] U.S. Cl. ........................ 425/192 R; 425/381; 425/466; 425/532
[58] Field of Search .......................... 425/192 R, 381, 425/532, 466

[56] References Cited

U.S. PATENT DOCUMENTS

| | | | |
|---|---|---|---|
| 1,618,026 | 2/1927 | Royle | 425/192 R |
| 3,218,672 | 11/1965 | Langecker | 425/381 |
| 3,372,429 | 3/1968 | Kato | 425/532 |
| 3,453,690 | 7/1969 | Mayner | 425/192 R |
| 3,909,183 | 9/1975 | Hsu | 425/466 |
| 4,059,373 | 11/1977 | Maier | 425/192 R |
| 4,382,766 | 5/1983 | Feuerherm | 425/465 |
| 4,565,515 | 1/1986 | Maier | 425/381 |
| 4,717,326 | 1/1988 | Motonaga et al. | 425/133.1 |
| 5,435,964 | 7/1995 | Kagitani et al. | 264/514 |

*Primary Examiner*—Robert Davis
*Attorney, Agent, or Firm*—Stephen H. Friskney

[57] ABSTRACT

The accumulator of an extrusion blow molding machine is constructed so that the programming cylinder and die adjustment rod have axially aligned bores to receive a die pin retaining rod. The retaining rod holds the die pin in place by means of a lower split ring that nests inside the die pin and a lock nut combined with an upper split ring associated with the programming cylinder. When the lock nut is loosened and the upper split ring is removed, the retaining rod is moved down (while the die pin is held in place) and the lower split ring is removed. The die pin is then free to slide off the retaining rod and be removed from the accumulator head.

5 Claims, 3 Drawing Sheets

RETAINER FOR THE DIE PIN IN AN ACCUMULATOR HEAD

BACKGROUND OF THE INVENTION

1. Field of the Invention

The present invention relates generally to extrusion blow molding machines and, more particularly, to means for attaching the die tooling to the accumulator head in an extrusion blow molding machine.

2. Description of the Related Art

Containers and other hollow articles are frequently formed by blow molding. The blow molding process involves providing a tube of heated and softened plastics material (parison) about which a two-piece mold is closed. Air or another gas is introduced under pressure into the parison to expand it against the walls of the mold, forming the desired hollow article. Such blow molding machines can be of various types, the most common of which are extrusion-blow molding machines and injection-blow molding machines.

In extrusion-blow molding machines, plastics material is heated and softened in an extruder and is conveyed into a die head from which a tubular parison is extruded. The parison can either be continuous, whereby a plurality of molds are sequentially enclosed about successive, axially spaced portions of the parison, or individual parisons can be intermittently extruded and subsequently blown. In the latter instance, the die head is associated with a chamber, usually called an accumulator, in which the extruded material is accumulated to provide a predetermined volume of material. The accumulated volume of material is then ejected through an annular die at the outlet of the accumulator to form a parison having the desired length, diameter, and wall thickness distribution.

Typically, an accumulator has a purging system to accomplish the function of ejecting the accumulated material by forcing it through the die at the outlet, and a programming system to control the die opening at the outlet for varying the wall thickness of the extruded parison and to close the die while plastic for the next parison is being fed into the accumulator. The speed at which material is ejected by the purging system is often synchronized with the size of the die opening as controlled by the programming system. This synchronization enables the wall thickness to vary in a controlled manner over the length of the parison.

The die tooling that forms the parison includes a die pin (part of the programming system) that forms the inner diameter of the parison and a stationary die ring that defines the outer surface of the parison. Different sets of tooling are used for different parisons. Accordingly, it is often necessary to change the die tooling on an accumulator in order to form the proper parison for a particular mold.

The die pins of current accumulator head constructions typically have a threaded engagement with the adjustment rod of the programming system. Due to temperature differences in the components and operating conditions of the machine, as well as the significant weight of the pins in larger size heads, rotating the die pin for removal is difficult and damage of the threads is likely. These difficulties significantly lengthen the time required to change the die tooling.

SUMMARY OF THE INVENTION

It is an object of the present invention to provide a means of attaching the die pin in an accumulator head that provides proper retention of the die pin in the programming system during operation, but still facilitates easy removal when it is necessary to change the tooling or perform maintenance.

In the preferred embodiment, the present invention accomplishes the stated objectives by providing an accumulator construction in which the programming actuator and die adjustment rod have axially aligned bores to receive a die pin retaining rod that extends substantially the entire length (height) of the accumulator. The retaining rod functions to hold the die pin in place against the adjustment rod and programming actuator by engaging a split ring that nests inside the die pin at the outlet end of the accumulator. The opposite end of the retaining rod has a threaded section to receive a lock nut, along with a reduced diameter section that receives a second split ring above the programming actuator.

During operation, the lock nut is tight against the upper split ring so that the retaining rod connects the die pin with the adjustment rod and the associated programming actuator. With this configuration, the die pin position is controlled by the programming actuator to adjust the die outlet opening, as required.

To remove the die pin from the accumulator head, a support is first placed under the die pin. Pneumatic cylinders connected to the retaining rod are activated to support the weight of the rod while the lock nut is being loosened. When the lock nut is backed away to provide sufficient clearance, the upper split ring is removed. The retaining rod is moved down (through the adjustment rod) by the pneumatic cylinders while the previously provided support holds the die pin in place. When the retaining rod is lowered a sufficient distance to permit removal of the lower split ring, the support is lowered so that the die pin is free to slide off the retaining rod and be removed easily from the accumulator head.

In summary, the structure of the accumulator defined by the present invention facilitates much quicker change of die tooling, and allows easy removal of the die pin (without the possibility of thread damage) when maintenance is required.

DESCRIPTION OF THE PREFERRED EMBODIMENT

Figure 1:
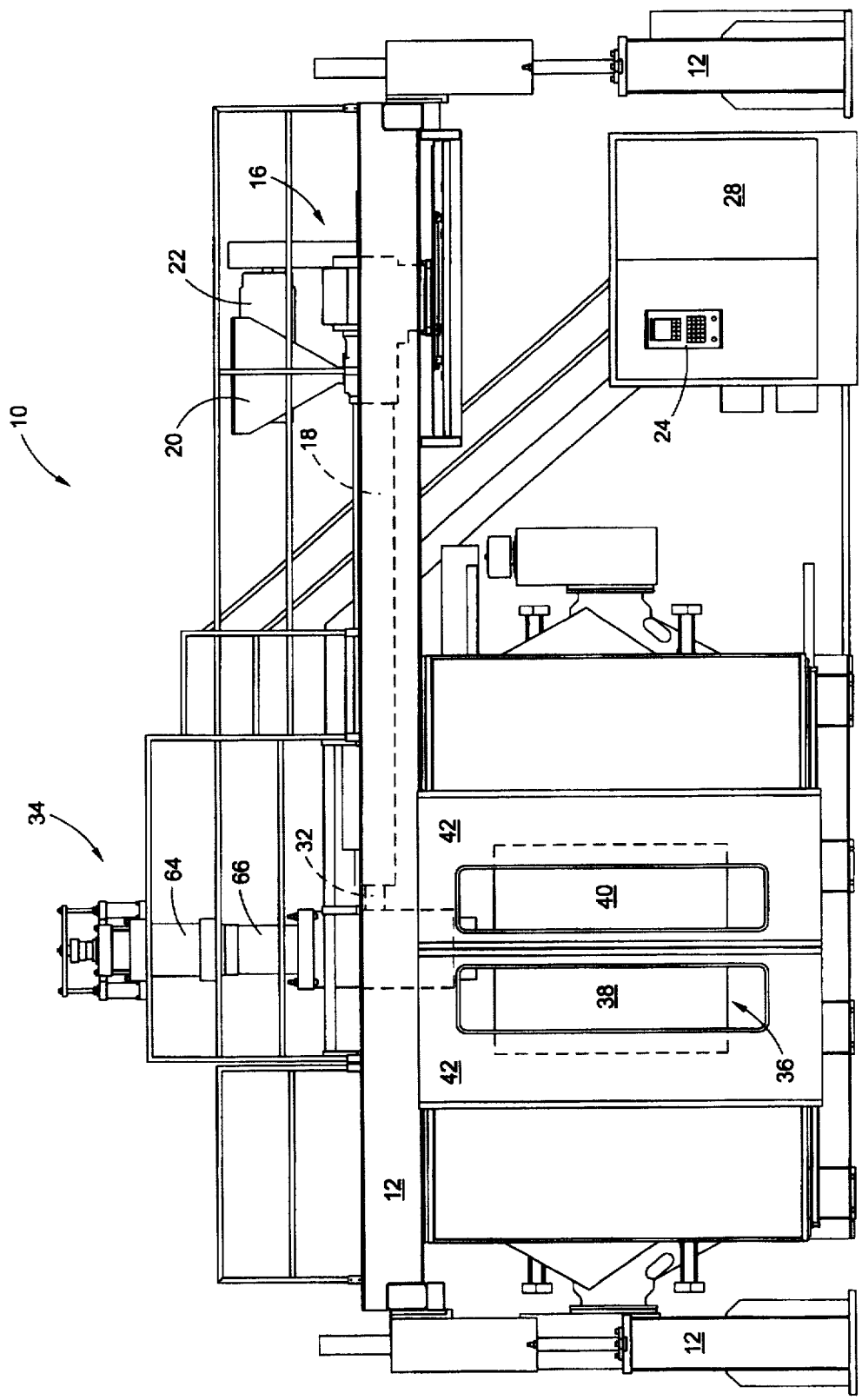
FIG. 1 is a side elevational view of an extrusion blow molding machine having an accumulator head with a die pin retainer in accordance with the present invention.

The present invention involves apparatus associated with extrusion blow molding. In order to better understand the invention, it is useful to describe it in the context of a typical blow molding machine including an accumulator. Referring now to the drawings, and particularly to FIG. 1, there is shown an extrusion-blow molding machine 10 including a supporting frame 12. Positioned on the upper section of the frame 12 is an extruder 16 having a tubular barrel 18 that contains a rotatable plasticizing screw (not shown). The plasticizing screw works in conjunction with heating of the barrel 18 to convey and soften solid plastics material, thereby providing a viscous, flowable melt for subsequent use in forming a parison, as is generally known in the art.

The solid plastic material is supplied to the extruder 16 through a feed hopper 20 that leads to an opening in the extruder barrel 18. The plasticizing screw is preferably rotated by an electric motor 22 suitably supported by the structure. Additionally, an electrical system cabinet 28 is provided for housing the electrical and electronic components used for controlling the various elements of the blow molding machine 10 as set by an operator control panel 24.

The outlet of the horizontally disposed extruder barrel 18 is connected by a material inlet coupling 32 to a substantially vertically disposed accumulator head 34, in order to transfer the plasticized material from extruder 16. Positioned below accumulator head 34 is a mold 36 configured in a manner known to those skilled in the art, typically in the form of two horizontally opposed mold portions 38,40. Each of the mold portions 38,40 is machined to define a mold cavity (not shown) that conforms in shape with the desired external surface conformation of the finished blow molded article when the two mold portions 38,40 are brought together. A cover or gate 42 is provided in front of mold 36. The upper portion of the accumulator 34 includes two hydraulic cylinders that have axially aligned mechanisms to provide an upper, programming actuator 64, and a lower, purging actuator 66.

Figure 2A:
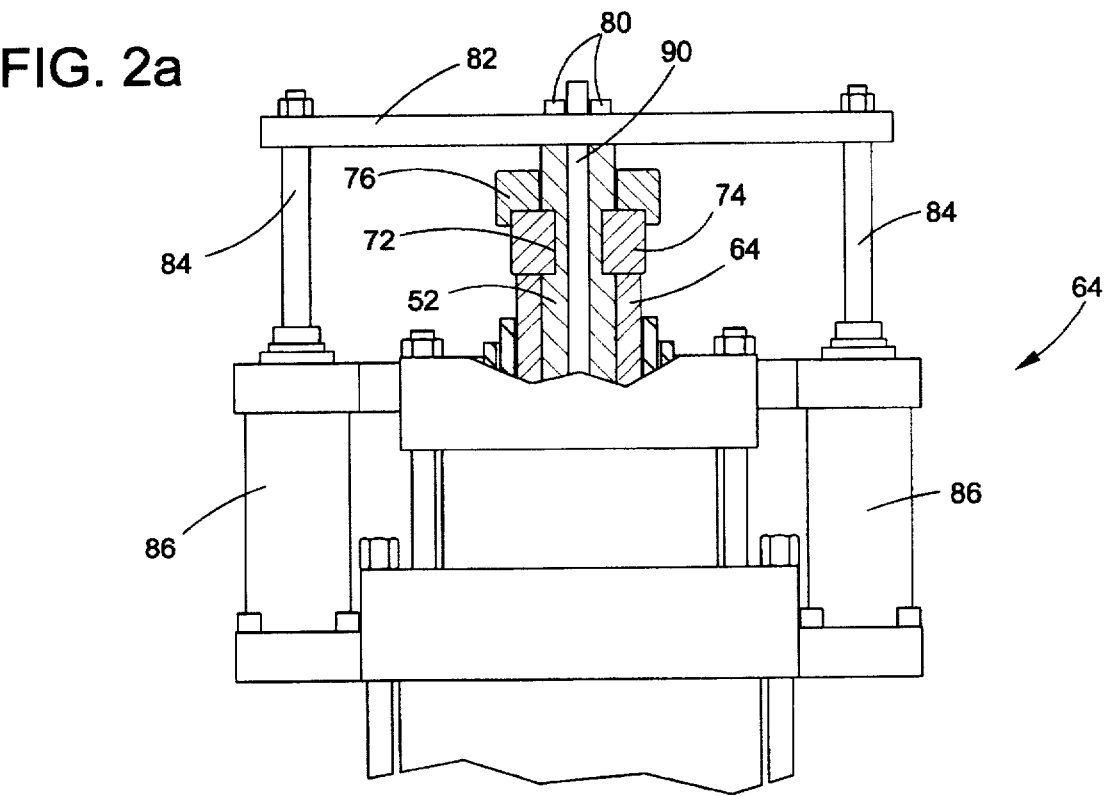
FIG. 2a and 2b are fragmentary, side elevational views, partially in section, showing the upper and lower portions of the accumulator, including the retaining rod and related components in accordance with the present invention, showing with the die pin attached in the operating configuration.
Figure 2B:
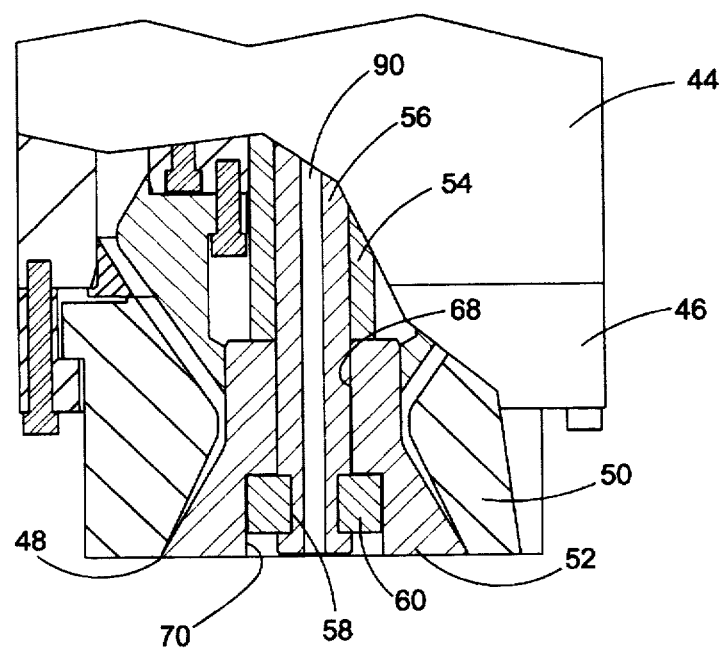
Figure 3A:
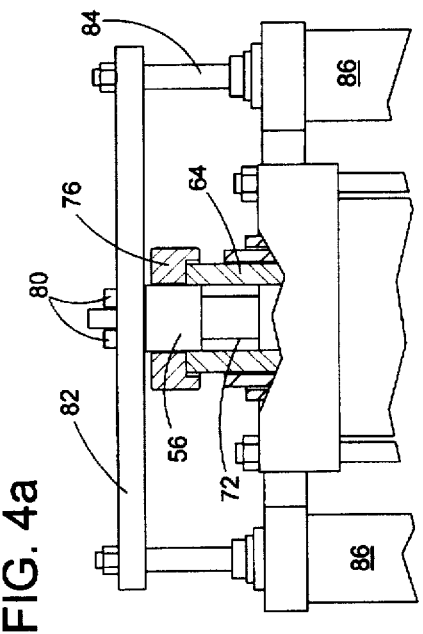
FIG. 3a and 3b are views similar to FIGS. 2a and 2b, showing with the die pin supported from below, the lock nut loosened, and the upper split ring removed.
Figure 3B:
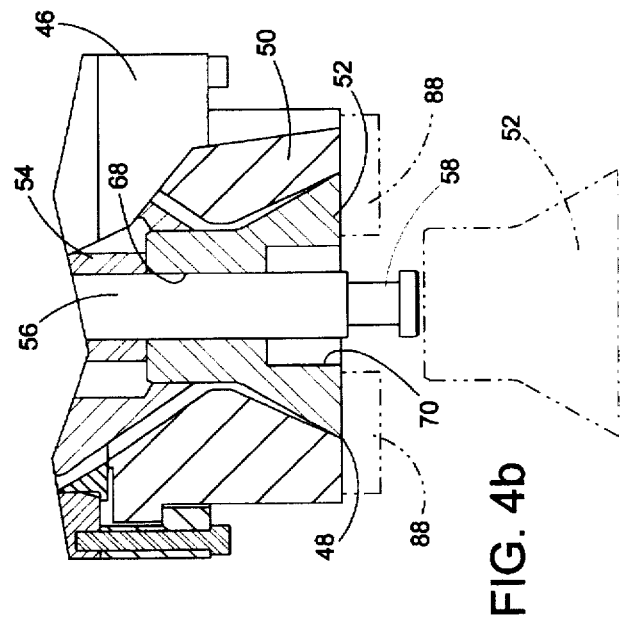

The accumulator head 34 provides a means of quickly forming a parison that requires a large quantity of plastic melt; the construction is shown in greater detail in FIGS. 2 through 4. As shown in the drawings, an accumulator outer barrel 44 of tubular form is oriented with its axis extending substantially vertically. The lower end of barrel 44 includes a material outlet which terminates in the form of an annular die outlet 48 through which the tubular parison (not shown) is extruded. Die outlet 48 is defined by a die outer ring 50 that is secured by means of a clamping ring 46 to the lowermost end of accumulator barrel 44, and by an inner die pin 52 that has a generally cylindrical outer surface spaced from the inner surface of die ring 50 to define a die outlet 48 of substantially annular form. The die pin 52 is one element of the programming system (as is familiar to those skilled in the art) that is used to control the size of the die opening 48.

The programming actuator 64 (FIG. 1) of the programming system is used to move die pin 52 up or down, thereby varying the size of the annular opening at parison die outlet 48. The actuator 64 also operates to close the outlet 48 while a shot of material is building in the accumulator chamber. In the embodiment shown, the die ring 50 and die pin 52 illustrate diverging tooling; i.e., downward movement enlarges the die opening to increase parison wall thickness and upward movement constricts the opening to decrease wall thickness, eventually closing the outlet so that the accumulator can be recharged. This type of tooling is typical for forming large parisons where the die pin 52 is correspondingly large. For example, a die pin for converging tooling in a "sixty pound" head might be twenty-eight (28) inches in diameter and weigh as much as thirteen hundred (1300) pounds.

As shown in FIGS. 2a and 2b, the accumulator 34 includes a retaining rod 56 that extends virtually the entire length (height) of the accumulator. Cooperating with retaining rod 56 is an adjustment rod 54 in the form of a tubular sleeve that is sized to receive the retaining rod 56. Similarly, the retaining rod 56 also passes through a suitably sized bore in the programming actuator 64 at the upper end of the accumulator 34. The lower end of retaining rod 56 is configured to engage die pin 52. In particular, the end of retaining rod 56 has a reduced diameter section 58 that receives the two halves of a split ring 60. The die pin 52 has an axial bore to accommodate the retaining rod 56 and split ring 60. In particular, an upper portion 68 of the bore in die pin 52 is sized to receive the retaining rod 56, and a lower, larger diameter portion 70 of the bore is sized to surround the split ring 60.

Near the upper end of retaining rod 56, there is another reduced diameter section 72 that is sized to receive an upper split ring 74. In addition, the uppermost end of retaining rod 56 is threaded to engage a lock nut 76. Preferably, the lock nut 76 has a counterbore 78 in its lower surface that is sized to surround the upper split ring 74. A cross-bar 82 is attached by bolts 80 at the extreme upper end of retaining rod 56, as shown in FIG. 2a. The bar 82 is connected to rods 84 of two pneumatic cylinders 86 that are positioned on opposite sides of the accumulator 34.

The purging actuator 66 (FIG. 1) is positioned below the programming actuator 64 and serves to impart vertical movement to the ram (not shown) of the accumulator head 34. The purging actuator 66 operates in a vertical (downward) direction that moves the ram and causes material contained in an annular, internal chamber of accumulator head 34 to be ejected in the form of a parison.

When the extrusion blow molding machine is in operation, thermoplastic material is plasticized in the extruder 16 and fed from the extruder into the accumulator 34. Since die pin 52 is initially in an upward, retracted position to close the parison die outlet 48, the plasticized material entering the accumulator head collects within the annular, internal chamber defined by the lower end of the accumulator outer barrel 44 and the lower end of adjustment rod 54 where it abuts the die pin 52. As the material continues to flow into this annular chamber, the ram is gradually pushed upwardly by the continuously accumulating material. The upward movement of the ram continues until it reaches a predetermined vertical position that corresponds to the desired volume of accumulated material.

When the desired volume of material has been transferred into the internal chamber near the end of accumulator outer barrel 44, programming actuator 64 is operated to move die pin 52 into position, thereby providing the desired size of the opening at parison die outlet 48 consistent with the wall thickness of the parison to be extruded. During operation of the programming actuator 64, the pneumatic cylinders would be depressurized, so that the rods 84 connected to cross-bar 82 would float freely with the movement of the programming actuator 64.

Purging actuator 66 is then operated to drive the ram in a downward direction, ejecting the plasticized material from accumulator barrel 44 in the form of a tubular parison. When the parison has been fully ejected, the mold portions 38,40 close around it. The programming actuator 64 is activated to retract die pin 52, closing die opening 48 so that the accumulator head 34 can begin building the next shot of material. About the same time, blowing air is introduced into the parison via a passage 90 that extends from the top of the accumulator 34 down though the retaining rod 56 and die pin 52 to an exit opening near the lowermost end of the accumulator 34. The blowing air expands the parison to fill the mold cavity defined by the mold portions 38,40.

When it is desired to change the die tooling or perform maintenance on the accumulator head 34, the components held together by retaining rod 56 can be quickly disassembled. First, the die pin is preferably retracted to the upper position shown in FIGS. 2b, so that a support 88, such as the arms of a fork truck, can be positioned as shown to support the weight of the die pin 52 and hold it in place. The pneumatic cylinders 86 are then activated to support the weight of the retaining rod 56. With the die pin 52 and rod 56 so supported, the lock nut 76 is loosened to move it out of engagement with the upper split ring 74. The lock nut 76 is rotated until it reaches a point where the split ring 74 can be removed from the reduced diameter section 72 of the retaining rod 56; see FIG. 3a.

Figure 4A:
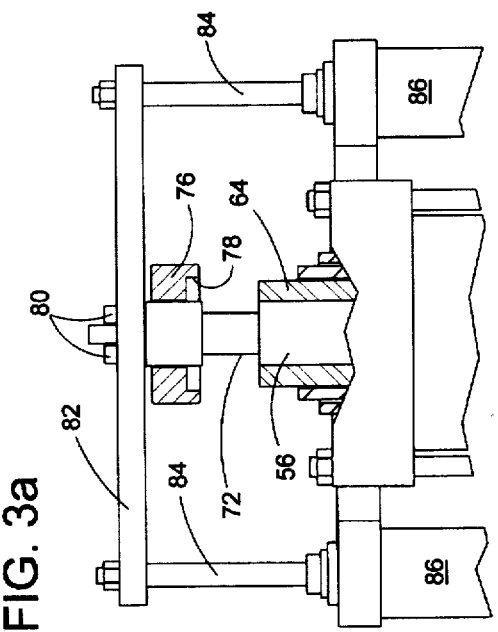
FIG. 4a and 4b are views similar to FIGS. 3a and 3b, showing with the die pin supported from below, the retaining rod lowered, and the lower split ring removed.
Figure 4B:
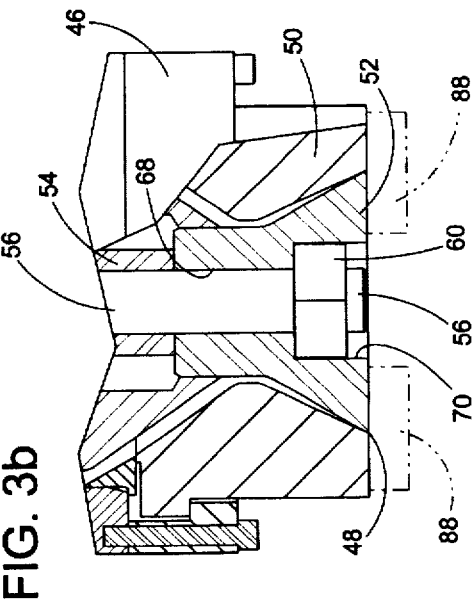

As illustrated in FIGS. 4a and 4b, after the upper split ring 74 is removed, the pneumatic cylinders 86 are operated to lower the retaining rod 56 so that it extends below the die pin 52 (held in place by support 88), allowing removal of the lower split ring 60. With the lower split ring 60 removed, the support 88 is lowered, or removed, allowing the die pin 52 to slide off the end of retaining rod 56. If desired, the die ring 50 can also be removed from end of accumulator 34 by first removing the clamp ring 46, as is generally known in the art.

The installation of a die pin 52 in the accumulator 34, is essentially the reverse of the procedure described above for removing the die pin 52. With the retaining rod 56 held in a suitable position by the pneumatic cylinders 86, the die pin 52 is placed on the rod 56 and raised up into the die ring 50 by a suitable support 88, sliding the pin 52 over the retaining rod 56. When the die pin 52 and rod 56 are properly positioned relative to each other, the split ring 60 is placed in the reduced diameter section 58 of the rod 56. The rod is then raised by pneumatic cylinders 86 until the split ring 60 is received within the large bore 70 of the die pin 52. The upper split ring 74 is then placed in the reduced diameter section 72 at the upper end of retaining rod 56; the lock nut 76 is tightened down against the split ring 74, locking the die pin 52 together with the adjustment rod 54 and programming actuator 64.

Although particular embodiments of the present invention have been illustrated and described, it will be apparent to those skilled in the art that various changes and modifications can be made without departing from the spirit of the present invention. For example, it is contemplated that alternate means for engaging retaining rod 56 with die pin 52 could be substituted for the split ring 60, as described. In addition, while shown in conjunction with a specific accumulator head construction, the concept of a quick change die pin can be used with other heads of differing construction, as are generally known in the art. It is, therefore, intended to encompass within the appended claims all such changes and modifications that fall within the scope of the present invention.

What is claimed is:

1. A blow molding machine including an accumulator head having a die pin, a programming actuator, a die adjustment rod, and means for retaining the die pin comprising a retaining rod connecting the programming actuator, die adjustment rod and die pin, wherein a portion of the retaining rod extends beyond the programming actuator so that the rod is accessible, die pin retaining means associated with the retaining rod adjacent the die pin for engaging the die pin on the retaining rod in a fixed position against the adjustment rod, and locking means for drawing together the die pin, adjustment rod and the programming actuator by applying tension to the retaining rod, so that the die pin retaining means holds the die pin in contact with the adjustment rod, whereby removing the locking means from the retaining rod releases the tension in the retaining rod, allowing the die pin retaining means to be removed from the retaining rod, and the die pin to be removed from the accumulator head.

2. The blow molding machine of claim 1 wherein the die pin retaining means further comprises retaining rod support means for positioning and supporting the retaining rod during attachment or removal of the die pin.

3. The blow molding machine of claim 2 wherein the retaining rod support means includes a cross-member attached at the upper end of the retaining rod, the cross-member being connected between two actuators positioned on either side of the accumulator.

4. The blow molding machine of claim 1 wherein the die pin retaining means comprises a lower split ring that releasably engages an annular groove in the lower end of the retaining rod.

5. The blow molding machine of claim 1 wherein the locking means comprises an upper split ring that releasably engages an annular groove in the upper end of the retaining rod, and a lock nut that tightens the upper split ring against the programming actuator.

* * * * *